US007480541B2

(12) United States Patent
Endo et al.

(10) Patent No.: US 7,480,541 B2
(45) Date of Patent: Jan. 20, 2009

(54) NUMERICAL CONTROLLER

(75) Inventors: Takahiko Endo, Kokubunji (JP); Yasushi Takeuchi, Hino (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/407,068

(22) Filed: Apr. 20, 2006

(65) Prior Publication Data

US 2006/0239386 A1 Oct. 26, 2006

(30) Foreign Application Priority Data

Apr. 20, 2005 (JP) ............................. 2005-122423

(51) Int. Cl.
*G06F 19/00* (2006.01)
(52) U.S. Cl. ...................... 700/186; 318/600
(58) Field of Classification Search ................ 700/180, 700/173, 188, 114, 128, 192, 186; 710/100; 318/600
See application file for complete search history.

(56) References Cited

U.S. PATENT DOCUMENTS

| 4,539,634 | A | * | 9/1985 | Sakai et al. | ................. | 700/180 |
| 4,924,403 | A | * | 5/1990 | Kawamura et al. | ........... | 700/180 |
| 5,144,214 | A | * | 9/1992 | Komatsu et al. | ............ | 318/600 |
| 5,404,308 | A | * | 4/1995 | Kajiyama | ................... | 700/188 |
| 5,596,256 | A | * | 1/1997 | Takizawa et al. | ............ | 318/600 |
| 6,885,909 | B2 | | 4/2005 | Isohata | | |
| 7,003,373 | B2 | * | 2/2006 | Baumann et al. | ............ | 700/189 |
| 2003/0187542 | A1 | * | 10/2003 | Endo et al. | .................. | 700/186 |

FOREIGN PATENT DOCUMENTS

| EP | 1 052 560 | 11/2000 |
| EP | 1 122 624 | 8/2001 |
| EP | 1 308 809 | 5/2003 |
| JP | 59-177604 | 10/1984 |
| JP | 1-293405 | 11/1989 |
| JP | 3-198104 | 8/1991 |
| JP | 10-244483 | 9/1998 |
| JP | 2003-303005 | 10/2003 |

OTHER PUBLICATIONS

Furness et al., Torque Control for a Form Tool Drilling Operation, IEEE Transactions Control System Techn. vol. 7, No. 1, Jan. 1999, pp. 22-30.*
Notice for Reasons for Rejections for corresponding Japanese Application 2005-122423, dated Jun. 13, 2008.
European Office Action, dated Jul. 31, 2006, in related European Application No. 06252135.6.

* cited by examiner

*Primary Examiner*—Kidest Bahta
(74) *Attorney, Agent, or Firm*—Staas & Halsey LLP

(57) ABSTRACT

A numerical controller capable of operating an auxiliary function at a target time or spindle position in performing operation based on table format data. An auxiliary function table is stored with auxiliary function commands M to be outputted corresponding to commanded reference times Lc and their corresponding operation delay times D. A reference time L is updated based in accordance with an override value. An auxiliary function command M and its corresponding operation delay time D are read from the auxiliary function table. The delay time D is corrected with the override value, and a reference time prior to a commanded reference time Lc by a margin equivalent to the corrected delay time is set as a command time Lr. If an override is entered, the delay time is corrected for the override amount and modified into an overridden reference time unit, and a command time for an auxiliary function is obtained and outputted based on the reference time unit. Thus, the auxiliary function is performed appropriately at a commanded value Lc of the reference time.

4 Claims, 5 Drawing Sheets

| REFERENCE VARIABLE Lc | POSITION X |
|---|---|
| Lx0 | X0 |
| Lx1 | X1 |
| Lx2 | X2 |
| Lx3 | X3 |
| Lx4 | X4 |

| REFERENCE VARIABLE Lc | POSITION Z |
|---|---|
| Lz0 | Z0 |
| Lz1 | Z1 |
| Lz2 | Z2 |
| Lz3 | Z3 |
| Lz4 | Z4 |

| REFERENCE VARIABLE Lc | AUXILIARY FUNCTION COMMAND M | OPERATION DELAY TIME D |
|---|---|---|
| L10 | M10 | t10 |
| L11 | M11 | t11 |
| L12 | M12 | t12 |
| L13 | M13 | t13 |
| L14 | M14 | t14 |

Tm

| AUXILIARY FUNCTION COMMAND M | OPERATION DELAY TIME D |
|---|---|
| M10 | t10 |
| M11 | t11 |
| M12 | t12 |
| M13 | t13 |
| M14 | t14 |

NUMERICAL CONTROLLER

BACKGROUND OF THE INVENTION

1. Field of the Invention

The present invention relates to a numerical controller for controlling a machine tool, and more particularly to a numerical controller for drivingly controlling respective axes in accordance with data stored in the form of a table.

2. Description of Related Art

Conventionally known is a numerical controller in which motion amounts and positions of individual axes are previously stored in a table format, and the axes are drivingly controlled based on the data stored in the table, not on block commands from an NC program. Thus, according to this arrangement, a tool can be freely operated without being restricted by the conventional block commands, so that the machining time is shortened and the machining accuracy is enhanced.

According to a well-known invention (see JP 59-177604A), a position of a movable axis for each time or rotation angle, for example, is previously stored as numerical control data, the time or rotation angle is monitored, and the numerical control data corresponding to the movable axis is outputted every time the stored time or rotation angle is attained.

According to another known invention (JP 2003-303005A), a data table is previously provided for storing command positions of X- and Z-axes for a reference position, and the reference position is obtained by multiplying a value in a counter for counting reference pulses by an override value. Based on this reference position, the X- and Z-axis command positions stored in the data table are outputted to perform synchronous control of the X- and Z-axes, whereby an override can be entered even in drive control based on the data stored in the data table. Further, the command positions can be connected based on linear, quadratic, or cubic functions, and a command can be issued for an auxiliary function.

In operation (hereinafter referred to as path table operation) such that the axes are driven in response to commands based on the table format data described in JP 2003-303005A, the auxiliary function commanded by the table format data can be outputted together with commands for the axis positions. Unlike auxiliary functions based on conventional NC sentences, the auxiliary function can be outputted at any desired time or spindle position, so that the output timing can be optimally adjusted to shorten the machining time.

Since the actual auxiliary function is subject to an operation delay, however, its operation is correspondingly delayed behind its output. In order to adjust the output timing optimally, therefore, the auxiliary function must be outputted earlier in consideration of the operation delay. If the time or spindle speed is overridden in the path table operation, moreover, the timing for actual operation varies depending on the set override value or actual spindle speed despite the hastened output. Thus, data must be prepared taking account of the actual override value, so that the data adjustment takes a lot of time, and the machining cycle is wasteful.

SUMMARY OF THE INVENTION

The present invention provides a numerical controller capable of performing an auxiliary function at a target time or a target position of a spindle (an axis that rotates in one direction) and of performing the auxiliary function at the target time or spindle position even in a case of applying an override.

A numerical controller of the present invention comprises: storage means storing time or a spindle position to output each of auxiliary-function commands in the form of a data table, and storing an operation delay-time period for each of the auxiliary-function commands; and output means for outputting each of the auxiliary-function commands prior to time to output the auxiliary-function command according to the data table, by the operation delay-time period stored for the auxiliary function command.

The operation delay-time periods may be stored in the data table for the auxiliary-function commands. Alternatively, the operation delay-time periods may be stored separately from the data table for the auxiliary-function commands.

The numerical controller may further comprise override means for overriding time or a spindle speed by a set override value, and the output means may convert the operation delay-time period into overridden time or an overridden spindle motion amount by the set override value, and outputs each of the auxiliary-function commands prior to the time or the spindle position designated in the data table, by the overridden time or the overridden spindle motion amount.

Since the auxiliary function command is outputted in precedence to the command time or the command spindle position by a margin equivalent to the operation delay time of the auxiliary function, the auxiliary function can be performed at a commanded reference position without an operation delay. If an override is entered, moreover, the auxiliary function command is outputted in consideration of the override, so that the auxiliary function can be performed in the commanded reference position despite the override.

DETAILED DESCRIPTION

Figures 1, 2A, 2B:
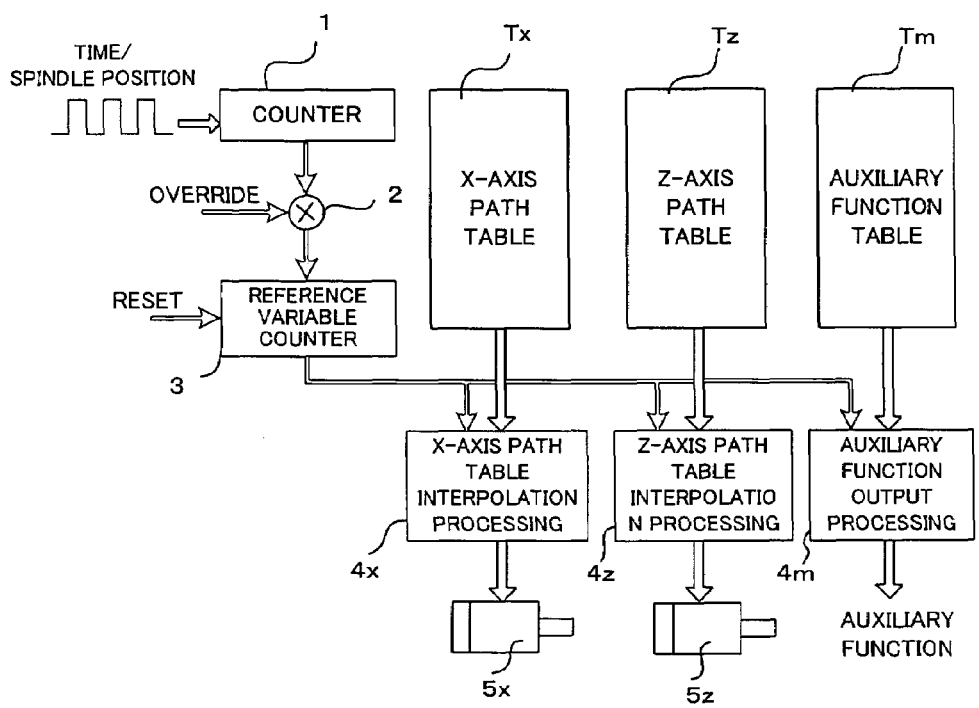
FIG. 1 is a schematic diagram showing path table operation functions executed by one embodiment of the present invention.
FIGS. 2a and 2b are diagrams illustrating examples of path tables according to the embodiment.

FIG. 1 is a schematic diagram showing path table operation functions executed by one embodiment of the present invention. In FIG. 1, pulses that indicate spindle positions from a position coder mounted on a spindle or reference pulses based on time from an external pulse generator section are inputted to a counter 1 and counted for each given period. Alternatively, the spindle positions may be counted in accordance with a command value for the spindle. For the reference pulses that are based on time, a count value in the counter 1 is multiplied by a scale factor set in override means by a multiplier 2 and stored in a reference variable counter 3. If the spindle positions are used as references, the override value is 100%. The reference variable counter 3 is reset when the path table operation functions are commanded, and path table operation is performed based on values L in the reference variable counter 3.

The values L in the reference variable counter 3 are inputted to path table interpolation processing sections 4$x$ and 4$z$ and an auxiliary function output processing section 4$m$ for individual control axes (X- and Z-axes in this embodiment). In the X- and Z-axis path table interpolation processing sections 4$x$ and 4$z$, command positions for the control axes compared with individual commanded values of the reference variable are obtained with reference to X- and Z-axis path tables Tx and Tz stored in a memory. Differences from command positions for the preceding period are outputted as move commands to control-axis motors 5$x$ and 5$z$. In the path table auxiliary function output processing sections 4$m$, moreover, auxiliary functions for the values L of the reference variable are outputted with reference to an auxiliary function table Tm.

FIGS. 2$a$ and 2$b$ show examples of the X- and Z-axis path tables Tx and Tz, in which the respective positions of the X- and Z-axes are set with respect to the commanded values Lc of the reference variable.

Figures 3, 4, 5:
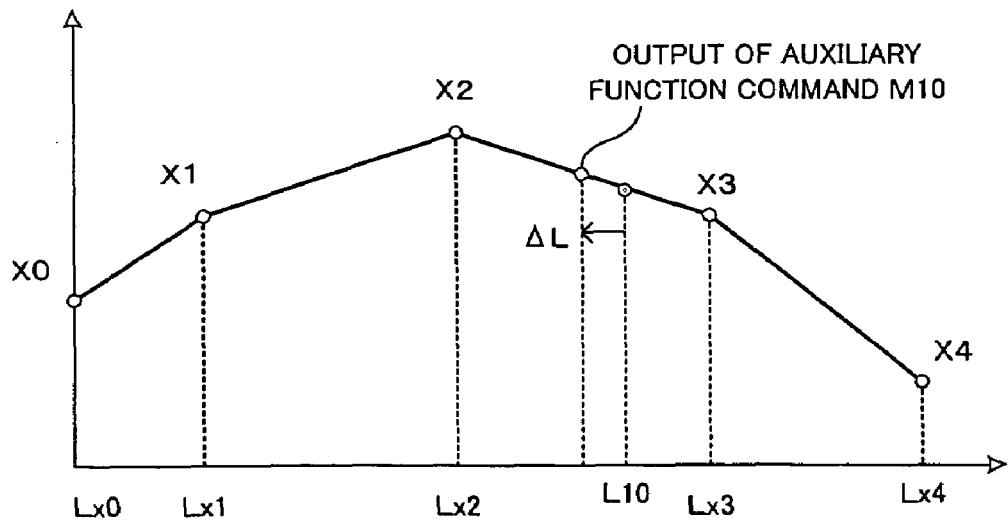
FIG. 3 is a diagram illustrating an example of an auxiliary function table according to the embodiment.
FIG. 4 is a diagram illustrating a table constituting a part of the auxiliary function table according to the embodiment.
FIG. 5 is a diagram illustrating the way an X-axis moves based on a path table according to the embodiment.

FIG. 3 shows an example of the auxiliary function table Tm, in which auxiliary function commands M are stored for the commanded values Lc of the reference variable in which the auxiliary functions are to be outputted, and delay times D of the auxiliary function operation are set together. In the case where a plurality of auxiliary function commands are outputted, the auxiliary function table Tm may be divided in two, a table that carries the auxiliary function commands M for the commanded values Lc of the reference variable and a table that carries the auxiliary function commands M and the operation delay times D. Specifically, tables may be used such that the operation delay times D are deleted from the table of FIG. 3 and the auxiliary function commands M shown in FIG. 4 and their corresponding operation delay times D are stored.

FIG. 5 is a diagram illustrating positions of the X-axis with respect to the reference variable L in the X-axis path table Tx. The X-axis motor 5$x$ is driven after interpolation processing is performed by the X-axis path table interpolation processing section 4$x$ so that X-axis positions for values of the reference variable L set in the X-axis path table Tx are reached. Likewise, the Z-axis motor 5$z$ is driven after interpolation processing is performed by the Z-axis path table interpolation processing section 4$z$, on the basis of the reference variable L and the Z-axis path table Tz.

Based on the commanded values of the reference variable and the auxiliary function commands stored in the auxiliary function table Tm, in the auxiliary function output processing section 4$m$, on the other hand, an auxiliary function command is outputted when the reference variable L reaches the commanded value. In the present embodiment, the auxiliary function command is outputted just short of the commanded values of the reference variable to cancel the operation delay time of the auxiliary function. Since an auxiliary function M10 and its delay time t10 are previously set for a commanded value L10 of the reference variable, the command of auxiliary function M10 is outputted in a reference position short of the commanded value L10 by an amount ΔL equivalent to the delay time t10, as shown in FIG. 5, and the auxiliary function M10 is performed at the commanded value L10 of the reference variable.

If the scale factor in the override means is "1", the reference pulses are directly counted by the reference variable counter 3 and represent the reference variable L, so that each control axis is run in synchronism with a reference axis, as in the conventional case. If the reference pulses are pulses that are generated from the position coder mounted on the spindle, the individual axes (X- and Z-axes) move in synchronism with the spindle. Correction of the operation delay time of the auxiliary function should only be outputted earlier by a margin corresponding to the set operation delay time (the operation delay time is set based on the override value at 100%). Since the speed of change of the reference variable varies when subjected to an override, the operation delay time D must be changed depending on the override value. In the present embodiment, the operation delay time is corrected and the auxiliary function is outputted based on the override value. If the override value is 50%, the speed of the reference variable L is half the speed obtained with the reference override value at 100%. The commanded auxiliary function operates in the commanded value of the reference variable when the operation delay time is adjusted to 50% of the set operation delay time.

The above is a description of an outline of the operation according to the present embodiment.

Figure 6:
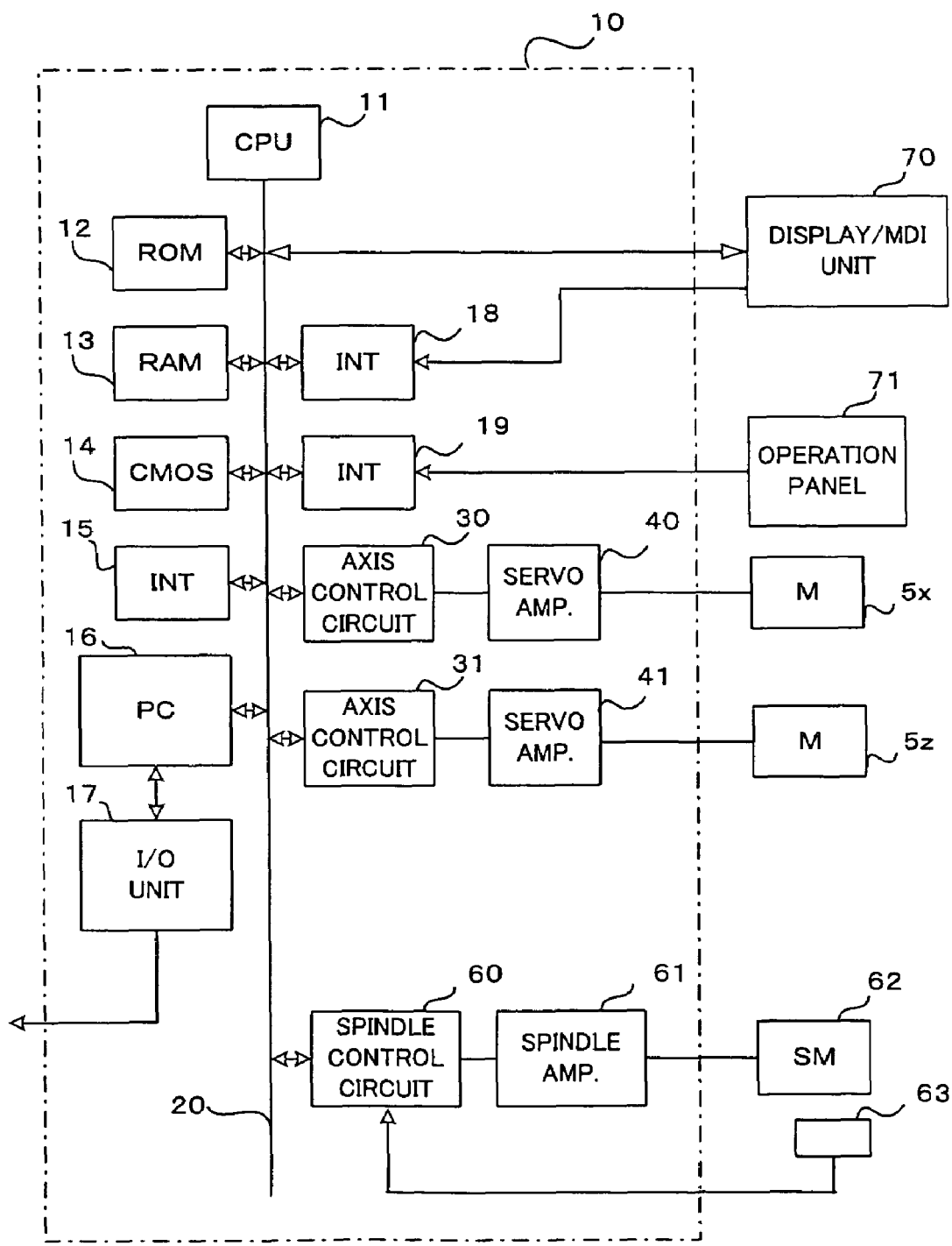
FIG. 6 is a schematic block diagram of a numerical controller according to the embodiment.

FIG. 6 is a schematic block diagram of a numerical controller 10 according to the one embodiment that performs the path table operation of the present invention. A CPU 11 is a processor for generally controlling the numerical controller 10. The CPU 11 reads a system program in a ROM 12 through a bus 20 and controls the entire numerical controller according to the system program. A RAM 13 is stored with temporary calculation data, display data, and various data inputted by an operator through a display/MDI unit 70. A CMOS memory 14, which is backed up by a battery (not shown), is constructed as a nonvolatile memory that can maintain a storage state even when the numerical controller 10 is switched off. The CMOS memory 14 is stored with a machining program read through an interface 15, a machining program inputted through the display/MDI unit 70, etc. Further, the CMOS memory 14 is previously loaded with the path tables Tx and Tz and the auxiliary function table Tm.

The interface 15 enables the numerical controller 10 to be connected to an external device, such as an adapter. A PC (programmable controller) 16 outputs a signal to an auxiliary device of a machine tool through an I/O unit 17 and controls it, based on a sequential program stored in the numerical controller 10. Further, the PC 16 receives signals from various switches and the like of a control panel on a body of the machine tool, performs necessary processing for the signals, and delivers them to the CPU 11.

The display/MDI unit 70 is a manual data input device that is provided with a display, such as a liquid crystal or CRT, a keyboard, and the like. An interface 18 receives commands and data through the keyboard of the display/MDI unit 70 and delivers them to the CPU 11. An interface 19 is connected to an operation panel 71 and receives various commands from the operation panel 71.

Axis control circuits 30 and 31 for the individual axes receive move commands for the axes from the CPU 11 and output them to servo amplifiers 40 and 41. On receipt of these commands, the servo amplifiers 40 and 41 drive the servomotors 5$x$ and 5$z$ for the axes, respectively. The servomotors 5$x$ and 5$z$ individually contain position/speed detectors. Position/speed feedback signals from these position/speed detectors are fed back to the axis control circuits 30 and 31 and used to perform position/speed feedback control. Position/speed feedback is not illustrated in FIG. 5.

Further, a spindle control circuit 60 receives a spindle rotation command and outputs a spindle speed signal to a spindle amplifier 61. On receipt of the spindle speed signal, the spindle amplifier 61 rotates a spindle motor 62 at a commanded rotational speed. In synchronism with the rotation of the spindle motor 62, a position coder 63 feeds back feedback pulses (reference pulses) and a one-revolution signal to the spindle control circuit 60 and performs speed control. The feedback pulses (reference pulses) and the one-revolution signal are read through the spindle control circuit 60 by the CPU 11, and the feedback pulses are used as reference pulses for the path table operation in the spindle position. In some cases, moreover, command pulses for the spindle may be utilized as the reference pulses.

Although the X- and Z-axes are used as the control axes in the embodiment described above, further control axes may be used additionally. If the additional control axes are used, it is necessary only that the nonvolatile memory be stored with path tables for the additional control axes and that the axis control circuits, servo amplifiers, and servomotors be increased in number.

In this embodiment, the X- and Z-axis path tables Tx and Tz shown in FIGS. 2a and 2b are stored in the nonvolatile memory 14 and the auxiliary function table Tm shown in FIG. 3.

When the table operation is commanded by the machining program, the CPU 11 drives the servomotors 5x and 5z for the X- and Z-axes based on the X- and Z-axis path tables Tx and Tz. Since this operation resembles the conventional path table operation, a description thereof is omitted. The present invention is characterized in that the auxiliary function command can be operated without delay during the path table operation. The following is a description of this operation.

Figure 7:
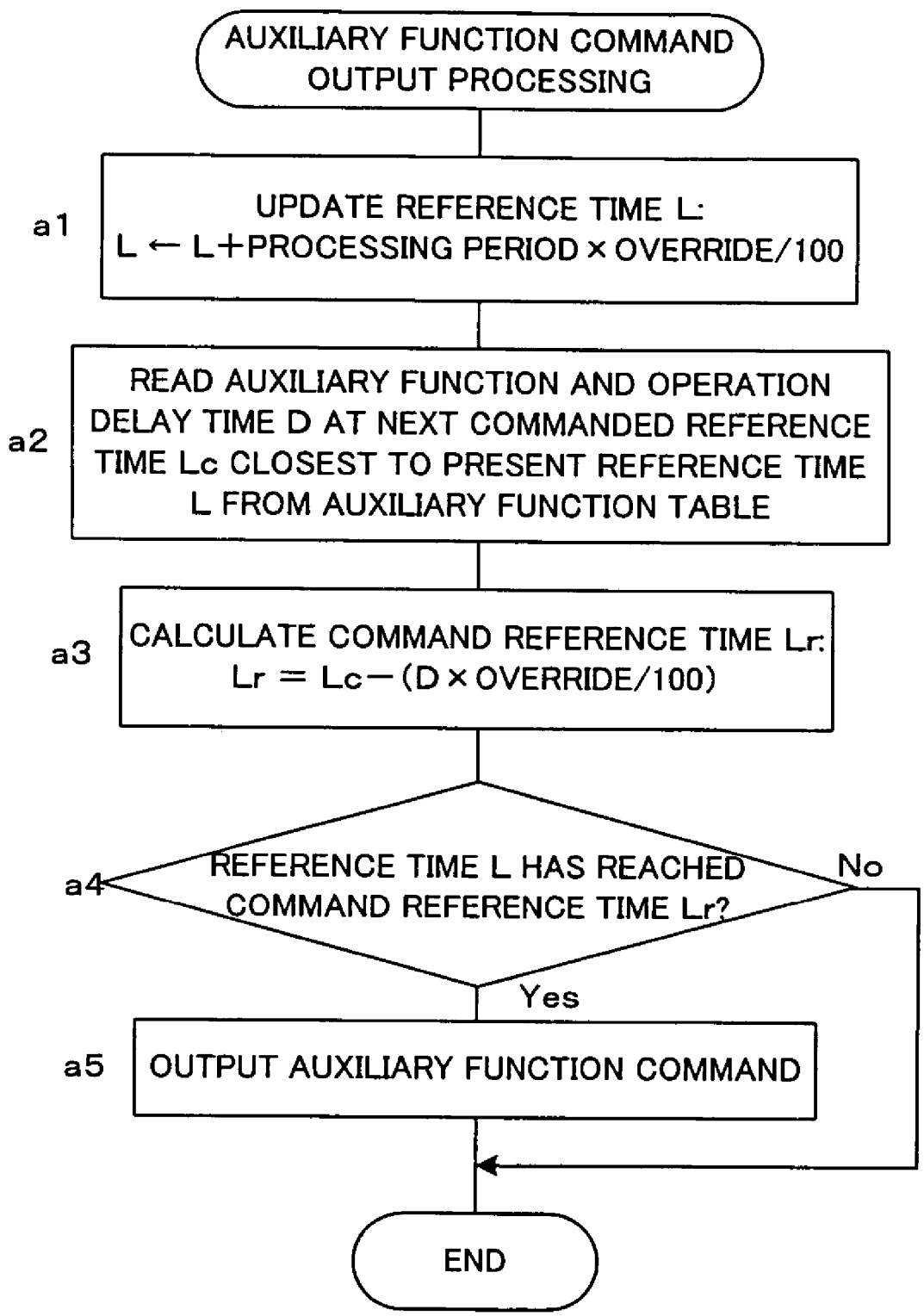
FIG. 7 is a flowchart showing an algorithm for auxiliary function output processing for the case where time is used as a reference position according to the embodiment.

FIG. 7 is a flowchart showing an algorithm for auxiliary function command output processing for the case where time is used as the reference variable (referred to as a reference time L in the processing shown in FIG. 7, since the reference variable is time), that is, where time pulses are inputted to the counter 1 shown in FIG. 1. The CPU 11 executes the processing shown in the flowchart of FIG. 7 for each given period.

First, the reference time (reference variable) L is updated. Specifically, the product of a processing time period and a value obtained by dividing the present override value (%) by 100 is added to the reference time L stored in a register (Step a1).

Then, an auxiliary function command M set for the next commanded reference time Lc closest to the reference time obtained in Step al (i.e., commanded reference time Lc later than and closest to the present reference time L) from the auxiliary function table Tm and its operation delay time D are obtained (Step a2).

Subsequently, a time Lr for actual output of the auxiliary function command is calculated. Specifically, the actual command time Lr is obtained by subtracting the product of the read operation delay time D and a value obtained by dividing the override value (%) by 100 from the read commanded reference time Lc (Step a3) as follows:

Command time $Lr$=Commanded reference time $Lc-$(Operation delay time $D$×Override value/100).

Since the processing period is a time without an override (override value=100%), the speed of progress of the reference time L changes when any other override value than 100% is entered. Accordingly, the operation delay time of the auxiliary function command set for the reference time L must be changed to match the change of the speed of progress of the reference time. Thus, the operation delay time D is multiplied by a hundredth of the override value divided to be converted into an overridden operation delay time D per unit reference time. The auxiliary function is outputted at a time short of the commanded reference time Lc by a margin equivalent to the resulting operation delay time. By doing this, correction is made so that the auxiliary function command operates at the commanded reference time Lc despite the override.

Then, it is determined whether or not the reference time L obtained in Step a1 has reached the command time Lr obtained in Step a3 (Step a4). If the command time Lr is not reached, the processing for the present processing period is terminated. If the command time Lr is reached by the reference time L, on the other hand, the auxiliary function command M read in Step a2 is outputted (Step a5). Even if the override is entered, therefore, the operation delay time D is corrected based on the override value, and the auxiliary function command M is outputted at a time short of the commanded reference time by a margin equivalent to the corrected operation delay time. Thus, the auxiliary function is performed at the commanded value Lc of the reference time.

Figure 8:
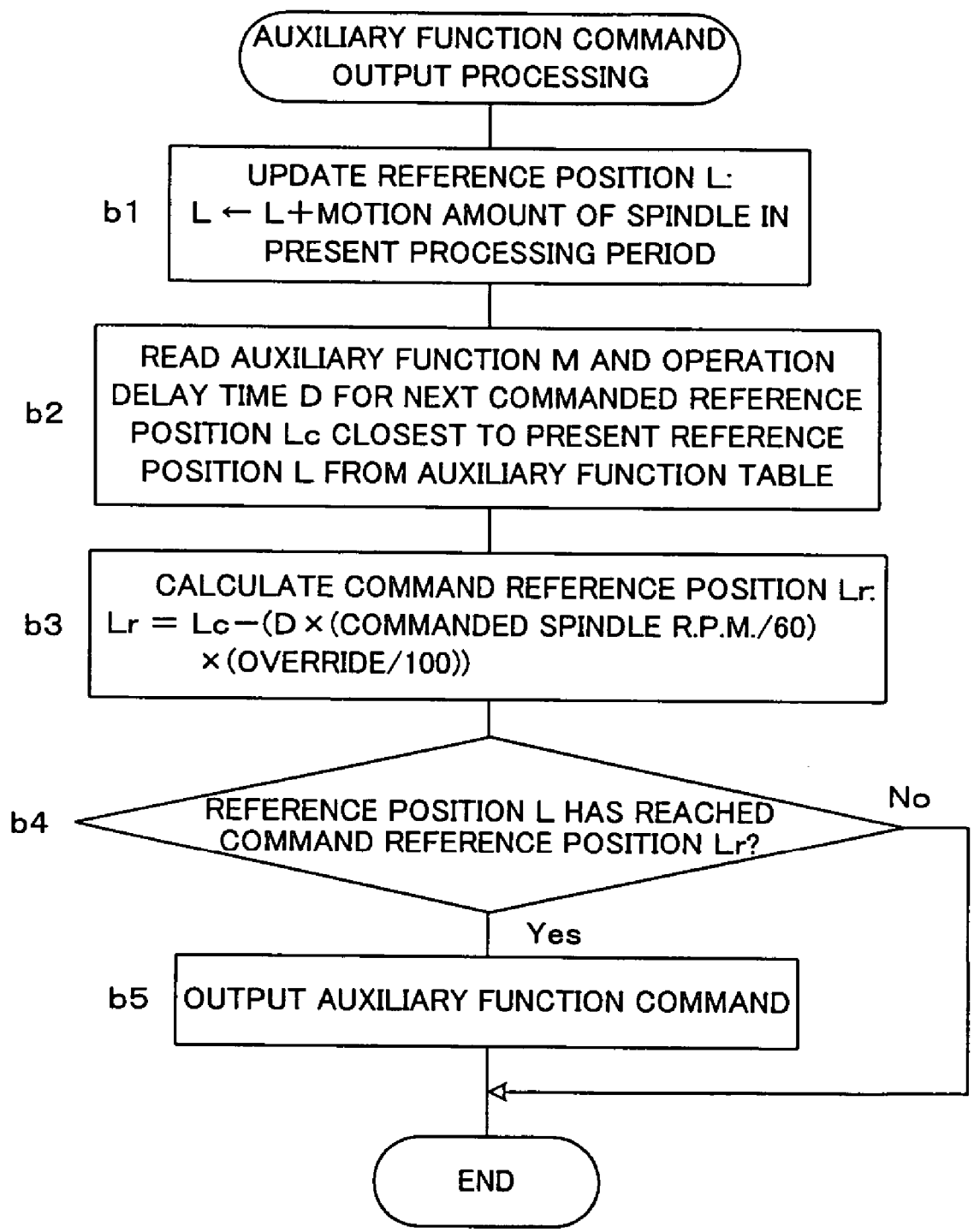
FIG. 8 is a flowchart showing an algorithm for auxiliary function output processing for the case where a spindle position is used as the reference position according to the embodiment.

FIG. 8 is a flowchart showing an algorithm for auxiliary function command output processing the CPU 11 of the numerical controller 10 executes for each given processing period for the case where the spindle position based on the feedback pulses from the position coder 63 is used as the reference variable L.

First, the reference position (spindle position) L is updated. Specifically, a motion amount of the spindle for the present processing period is added to the reference position L stored in a register (Step b1). Even if an override is entered, the spindle motion amount, which is an overridden motion amount, must only be added directly to the reference position L. The spindle position may be calculated based on the command value for the spindle.

Then, an auxiliary function command M set for the next commanded reference position Lc closest to the reference position obtained in Step b1 (i.e., commanded reference position Lc advanced from and nearest to the present reference position L in the case where the spindle is rotating forward) from the auxiliary function table Tm, and its operation delay time D are obtained (Step b2).

Subsequently, a position Lr for actual output of the auxiliary function command is calculated. Specifically, the actual command position Lr is obtained by subtracting the product of the read operation delay time D, a value obtained by dividing a present commanded spindle speed by 60 (or a value of the spindle speed per second (basic unit)), and a value obtained by dividing the override value (%) by 100 from the read commanded reference position Lc (Step b3) as follows:

Command position $Lr$=Commanded reference position $Lc-$(Operation delay time $D$×(Commanded spindle r.p.m./60)×(Override value/100).

Since the spindle is overridden as it moves, the actual spindle speed is obtained by multiplying the commanded spindle speed by the override value. The resulting product is converted into an amount of movement of the reference position corresponding to the operation delay time D by being multiplied by the operation delay time. Then, the command position Lr for a time earlier by a margin equivalent to the operation delay time D can be obtained by subtracting the reference position motion amount from the commanded reference position Lc.

Then, it is determined whether or not the reference position L obtained in Step b1 has reached the command position Lr obtained in Step b3 (Step b4). If the command position Lr is not reached, the processing for the present processing period is terminated. If the command position Lr is reached by the reference position L, on the other hand, the auxiliary function command M read in Step b2 is outputted (Step b5). Even if the override is entered, therefore, the operation delay time D is corrected based on the override value, and the auxiliary function command M is outputted at a time earlier by a margin equivalent to the corrected operation delay time. Thus, the auxiliary function operates in the commanded reference position Lc.

What is claimed is:

1. A numerical controller comprising:
   storage means for storing a commanded value of time or a spindle position as a reference variable to output each of auxiliary-function commands in the form of a data table, and storing an operation delay-time period for each of the auxiliary-function commands; and
   output means for outputting each of the auxiliary-function commands prior to time to output the auxiliary-function command according to the data table, by the operation delay-time period stored for the auxiliary function command.

2. A numerical controller according to claim 1, wherein the operation delay-time periods are stored in the data table for the auxiliary-function commands.

3. A numerical controller according to claim 1, wherein the operation delay-time periods are stored separately from the data table for the auxiliary-function commands.

4. A numerical controller according to claim 1, further comprising override means for overriding time or a spindle speed by a set override value, wherein said output means converts the operation delay-time period into overridden time or an overridden spindle motion amount by the set override value, and outputs each of the auxiliary-function commands prior to the time or the spindle position designated in the data table, by the overridden time or the overridden spindle motion amount.

* * * * *